Oct. 3, 1933.                A. W. DAW                1,928,994
                ROTARY INTERNAL COMBUSTION ENGINE
              Filed Feb. 9, 1929            4 Sheets-Sheet 1

INVENTOR,
Albert Williams Daw
BY HIS ATTORNEYS
Baldwin & Wight

Oct. 3, 1933.  A. W. DAW  1,928,994
ROTARY INTERNAL COMBUSTION ENGINE
Filed Feb. 9, 1929   4 Sheets-Sheet 2

Inventor
Albert W. Daw
By his attorneys,
Baldwin Wight

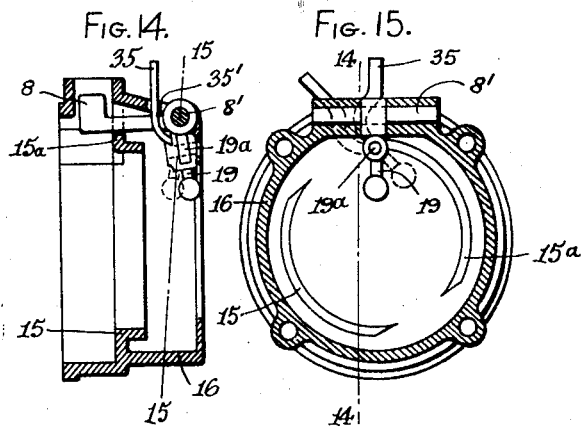
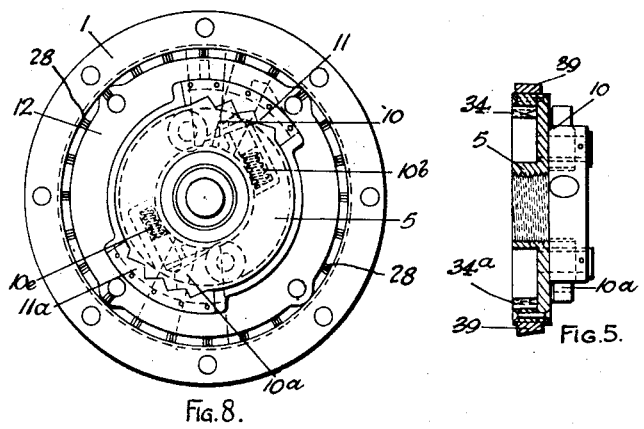
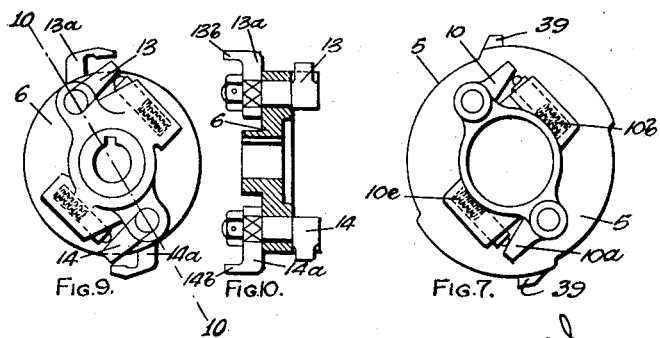

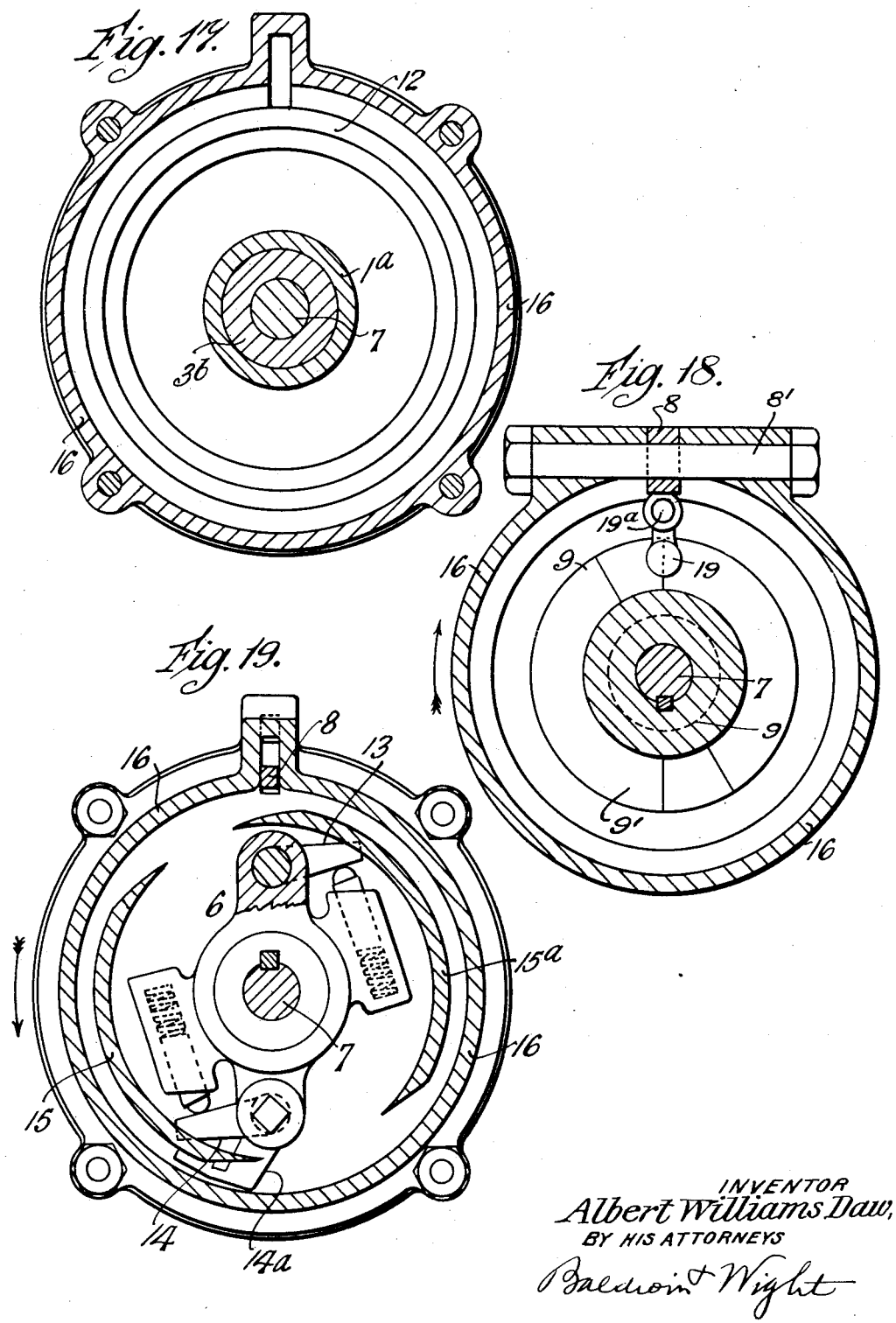

Patented Oct. 3, 1933

1,928,994

UNITED STATES PATENT OFFICE 1,928,994

ROTARY INTERNAL COMBUSTION ENGINE

Albert Williams Daw, London, England

Application February 9, 1929, Serial No. 338,725, and in Great Britain February 20, 1928

6 Claims. (Cl. 123—11)

The invention relates to the class of rotary engine wherein two or more pairs of vanes rotate unidirectionally in steps about a central shaft to which the several pairs are alternately connected so as to drive it, those pairs which are not driving acting as abutments.

This invention is a new rotary internal combustion engine in which two full cycles of the required operations for internal combustion are carried out in a single cylinder in each revolution so that the lightest possible construction and highest efficiency may be obtained.

The mechanism comprises two balanced pairs of wings or piston vanes, located within a cylindrical shell or cylinder, and which are carried by a central boss from which extends a hollow trunnion disposed in a boss, or bearing, forming a part of the cylindrical shell, or cylinder. The piston vanes are preferably of triangular form, the longitudinal sectional form of the cylindrical shell corresponding with the form of the piston vanes. By means of these piston vanes and the exterior gearing employed therewith a full four stroke cycle is performed in each half revolution by one pair of the piston vanes coming into driving engagement with the shaft, or axle, whilst the other pair is stationary and acts as an abutment, which conditions are reversed in the latter part of the half revolution by the cushioning action of the compressed air or gases between the vanes causing the energy of the rotating pair to be transferred to the pair acting as an abutment, the latter thereby acquiring the angular velocity of the shaft and coming into driving engagement with the mechanism of the exterior gear without shock.

The engine is illustrated in the accompanying drawings in which:—

Fig. 5 is a side elevation partly in section of the trunnion disc with ratchet pawl mechanism the section being taken along the line 5—5 in Figure 6.

Fig. 7 is a rear elevation of the trunnion disc and ratchet pawl mechanism of Fig. 5.

Fig. 8 is an end view of the casing of the cylindrical shell with gear cover removed.

Fig. 9 is an elevation of the shaft disc with ratchet pawl mechanism.

Fig. 10 is a part section thereof through the pawls the section being taken along the line 10—10 of Figure 9.

Fig. 14 is a longitudinal section through the gear case of Figure 1, showing latch.

Fig. 15 is a transverse section thereof along the line 15—15 of Figure 14.

Fig. 17 is a transverse vertical sectional view taken on the line 17—17 of Fig. 1.

Fig. 18 is a transverse vertical sectional view taken on the line 18—18 of Fig. 1, and Fig. 19 is a transverse vertical sectional view taken on the line 19—19 of Fig. 1, certain parts being shown in elevation.

Figure 1:
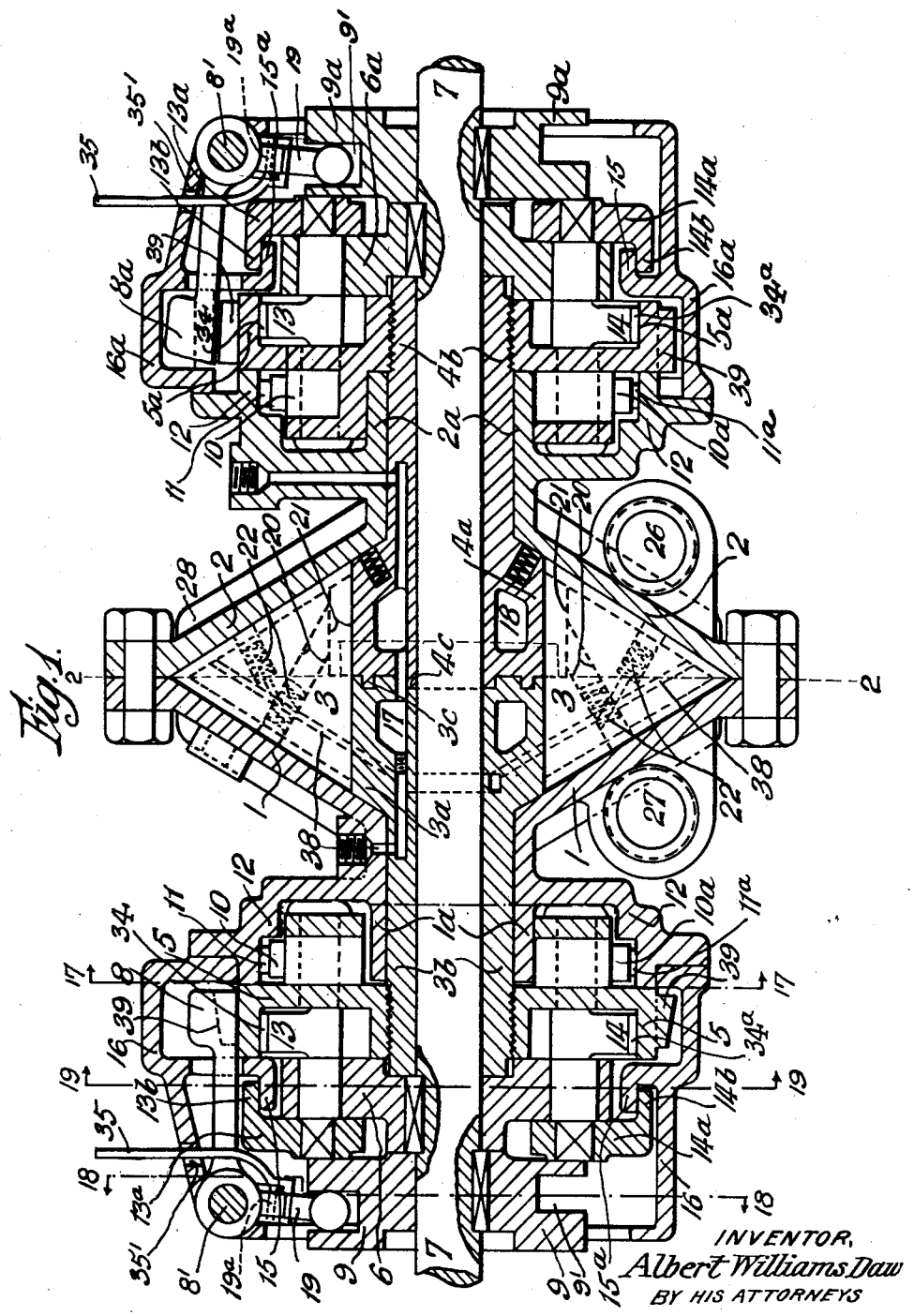
Fig. 1 is a longitudinal section through the system on a larger scale than the remaining figures.

In these drawings 1 and 2 are the main cylinder, or cylindrical shell when the piston vanes are of triangular form; $1a$ and $2a$ bosses or bearings on the cylindrical shell for the hollow trunnions $3b$ and $4b$; 3 and 4 the two pairs of piston vanes of which $3a$ and $4a$ are the hollow central bosses; $3c$ and $4c$ hollow projections from the central part or boss of one pair of the piston vanes; 5 and $5a$ the trunnion discs; 6 and $6a$ the shaft discs; 7 the shaft or axle; 8 and $8a$ pawls or latches for engaging the trunnion discs; 9 and $9a$ the cams on the shaft by which the latches are operated; 26 the induction port; 27 the exhaust port; 28 radiating fins; and 16 and $16a$ the gear casings, the pawls or latches 8 and $8a$ being pivoted to the latter at $8'$.

The central bosses $3a$ and $4a$ of each pair of piston vanes preferably extend only to midway of their length thus causing the wings to form a fork $3d$ into which the central boss of the other pair of piston vanes enters, and from the boss $4a$ projections of smaller diameter $3c$ and $4c$ telescope into recesses in the boss $3a$. The main shaft or axle 7 passes through both pairs of piston vanes and is so connected to the trunnions alternately by means of the exterior mechanisms below described that it is rotated by the piston vanes, and to ensure rotation in one direction only, ratchet gear is employed. Two openings 26 and 27 in the cylindrical shell or cylinder are required for induction and exhaust for the engine to perform two full cycles of an internal combustion engine during each revolution.

The exterior gear of each pair of piston vanes is the same, and will be understood from the following description of one of them. Taking the one on the left of Fig. 1, Figs. 1 to 14, it will be seen that it consists of the trunnion disc or cylindrical cap 5, fixed to the trunnion, carrying ratchet bolts or pawls 10 and 10a on which bear springs 10b and 10e to cause them to engage ratchet teeth in the parts 11 and 11a of the cylinder disc 12 which is a part of the cylindrical shell, such engagement being for the purpose of preventing any reverse movement of the piston vanes; the shaft disc or circular block 6, fixed to the shaft, carrying two ratchet bolts or pawls 13 and 14 to engage with the ratchet teeth in the parts 34 and 34a of the trunnion disc (also the locking arms 13a and 14a mounted on the axis of the pawls 13 and 14), the connection between each pawl and its locking arm being such that neither can move independently of the other; the pawl or latch 8; for engaging the trunnion disc preferably by means of a projection 39 thereon; and the shaft cam 9 by means of which the pawl or latch 8 is operated. Cams 9 and 9a have grooves 9' in which arms 19 of the pawls or latches 8 and 8a are normally disposed.

By means of the said gear, the piston vanes, which have acted as an abutment, drive the shaft on their attaining the same angular velocity, and are disengaged from driving same when the rotating vanes are being retarded to rest by the reaction of the compressed air or gases between the two pairs of vanes. After leaving the abutment position (see Figs. 2 and 20) the piston vanes are carried into positive engagement with the shaft through the wings 13b and 14b of the locking arms 13a and 14a mounted on the axis of the pawls 13 and 14 of the shaft disc travelling in or on the paths 15 and 15a, provided by the gear casing 16, the projections or wings 13b and 14b of the locking arms on reaching the ends of the paths 15 and 15a running out of such positive engagement with the shaft so that the rotating vanes will be retarded to rest by the compressed air and gases between the two pairs of vanes towards the end of the cycle. Should the rotating vanes be retarded to rest before they have quite completed 180 degrees of arc then they will be moved up to the latch when the compression pressure of the next cycle exceeds the expansion pressure. The latch is required on starting the engine to hold the abutment vanes in position until the rotating vanes have reached the required position for their being accelerated to the speed of the shaft, and also for throwing the two pairs of piston vanes out of gear with the shaft for "freewheeling". With proper adjustment of the cam for lifting the latch it will be lifted out of engagement with the trunnion disc before the said difference between the compression and expansion pressures can cause the abutment vanes to move up to the latch.

Whilst the abutment vanes are at rest the ratchet pawls of their shaft disc run free of positive engagement with the ratchet teeth of their trunnion disc as the latter does then not come into positive engagement with the shaft through the wings 13b and 14b of the pawls of the shaft disc engaging the paths 15 and 15a provided by the gear casing.

The cylindrical shell or cylinder is either air-cooled or water-jacketed; and the passages 17 and 18 provided in the hollow central bosses of the piston vanes enable oil to be circulated through the wings projecting therefrom to prevent overheating when the engine is so large as to render this necessary. Small engines are not liable to overheating of the piston vanes as these are partly cooled by contact with the air drawn into the system whilst a larger ratio of expansion than of compression is obtained by which means a lower temperature is ensured for the gases going to exhaust and consequently higher thermal efficiency. Suitable passages 38 are provided for lubrication of the ends of the piston vanes.

Figure 2:
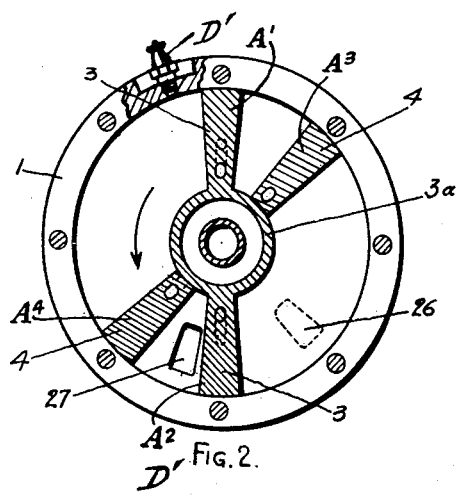
Fig. 2 is a transverse section through the centre thereof taken on the line 2—2 of Figure 1.
Figure 4:
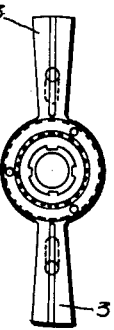
Fig. 4 is an end elevation thereof.

For a clear understanding of the operation of the engine, the wings of the piston vane 3 are denominated $A^1$ and $A^2$ respectively, and the wings of the piston vane 4 are denominated $A^3$ and $A^4$ respectively, (see Figs. 2 and 20). It is assumed that the vanes 3 and 4 are in the positions shown in Fig. 2, and that the various parts are at rest. In this position of the vane 3 which is connected to the trunnion disc 5, the projection 39 on the disc 5 will be in abutting relation with the latch 8 shown at the left of Fig. 1, the latch having been lowered into the path of the projection 39 by the cam 9. The shaft is then rotated in the direction of drive as indicated by the curved arrows, and the vane 4 will be rotated by virtue of the engagement of the pawls 13 and 14 on the shaft disc 6a with the ratchet teeth 34 and 34a on the trunnion disc 5a. At this stage of the operation the pawls are maintained in positive engagement with the ratchets on the trunnion disc 5a through the engagement of the wings 13b and 14b of the locking arms 13a and 14a attached to the pawl spindles, with the paths 15 and 15a. During this rotation of the vane 4, gas is being compressed between the vane wing $A^3$ of the moving vane 4 and the vane wing $A^1$ of the vane 3 which is held stationary by means of the latch 8. The latch will then be raised by the cam 9 and the vane 3 will be moved to the position shown in Fig. 16 by the force of the compressed gas and air between the vane wings $A^1$ and $A^3$. Meanwhile, the wings of the locking arms 13a and 14a on the shaft disc 6a will have run off the associated paths 15 and 15a and the vane 4 being no longer positively connected to the shaft disc and shaft will continue to rotate by its own inertia until it is brought to rest by the re-acting pressure between the vane wings $A^1$ and $A^3$. When so brought to rest, the pawls 10 and 10a on the trunnion disc 6a will engage teeth of the arcuate racks 11 and 11a on the casing 12, and the vane 4 is thus maintained against reverse rotation, whereby this vane acts as the abutment vane during the succeeding part of the cycle. The latch 8 having been raised by the cam, the vane 3 will have been moved in the direction of the arrow until it is in the position shown in Fig. 16, the vane 4 having by this time also reached the Fig. 16 position.

On the raising of the latch the vane wing $A^1$ passes the sparking plug D' and firing of the charge between the wings $A^1$ and $A^3$ takes place, this causing the gases between the vane wings $A^1$ and $A^3$ to drive the vane with the wings $A^1$ and $A^2$ forward until the pressure of the expanding gases between the vane wings $A^1$ and $A^3$ is equal to the pressure of the compressed air or air-petrol mixture between the vane wings $A^2$ and $A^3$. Thereupon the engagements between the shaft disc 6 and trunnion disc 5 are maintained by the fly-wheel effect of the moving parts and through the locking paths 15 and 15a being engaged by the wings or shoes 13b and 14b until they slide out of engagement at the end of each path, the compressing or driving vane 3 being then free to move under its own inertia. Meanwhile the abutment vane 4 with the wings $A^3$ and $A^4$, through reduction of the pressure of the expanding gases below the compression pressure, is free to move forward in the direction of the curved arrow. Further compression between the vane wings A² and A³ thus results, owing to the angular velocity of the compression vane 3 being at first greater than that of the abutment vane 4, with retardation of the compression vane 3 to rest, in which position its return movement is prevented by the non-return pawls of the trunnion disc 5 engaging the arcuate racks 11 and 11a of the cylinder casing 12. During this period the abutment vane 4 is accelerated to the angular velocity of the shaft, either with or without firing the charge, whereupon the arcuate racks of its trunnion disc 5a engage the pawls of the shaft disc 6a to drive the shaft. After the engine is started the latch 8 is operated by its cam 9 without engaging the trunnion disc, and, on the abutment vane 4 with the wings A³ and A⁴ being accelerated to the angular velocity of the shaft, the vanes reach the positions shown in Fig. 16 with the vanes 3 and 4 interchanged relative to their starting positions.

With increase in the speed of running the engine, the shaft disc pawls of the two gears alternately successively advance so as to engage the second, third and fourth teeth of the racks of the trunnion disc of the vane acting as abutment, through the mechanism causing the compression vane to be released proportionately sooner from its locking gear, such earlier release being essential for retarding it to rest under the reaction of the gases; otherwise the inertia force of the compression vane which is of great magnitude at high speed would cause inelastic impact and breakage. After its release the compression vane continues to compress the charge between it and the abutment vane until both vanes have the same velocity, and is then retarded to rest.

Figure 16:
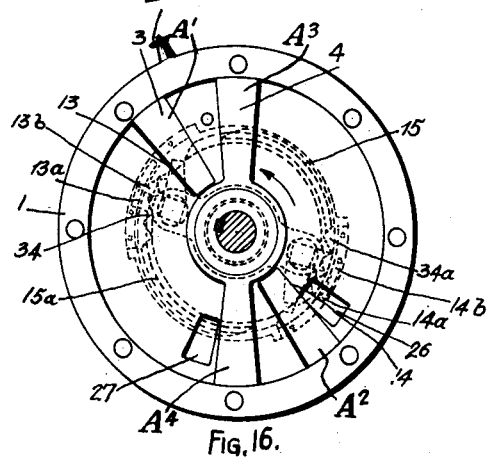
Fig. 16 is a diagram to illustrate engagement and release of trunnion disc with shaft disc.
Figure 3:
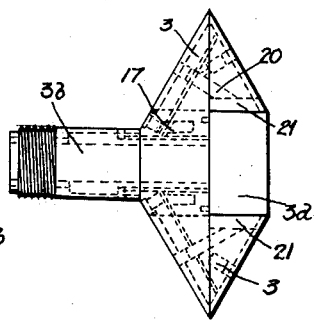
Fig. 3 is a plan of each pair of piston vanes when the wings are of triangular form.
Figure 6:
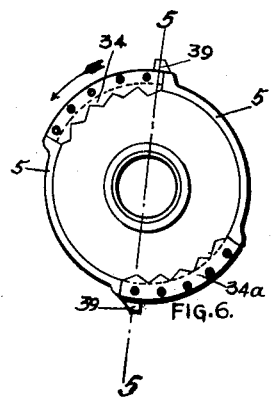
Fig. 6 is a front elevation of the trunnion disc and ratchet pawl mechanism of Fig. 5.
Figures 11, 12, 13:
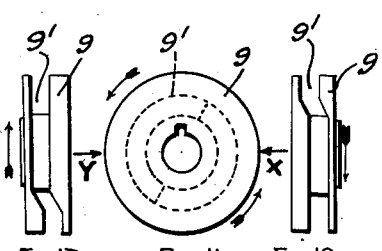
Figs. 11, 12 and 13 show the shaft cam mechanism for actuating the latch, Figure 11 being a front elevation, Figure 12 a side view looking in the direction of the arrow X in Figure 11, and Figure 13 a side view looking in the direction of the arrow Y.

Firing always takes place after the charge is fully compressed; therefore with the suction port 26 and the exhaust port 27 placed as in Fig. 16, ignition of the charge with expansion of the gases takes place behind the vane wing A¹ with scavenging action in front of it, whilst the vane wing A² compresses the charge in front of it and draws in a new charge behind it, the compression vane coming to rest in the abutment position immediately after firing the charge.

In the present construction, a full cycle is completed in each half revolution of the shaft. Each cycle commences with the firing of the charge between the vane wings A¹ and A³ positioned as in Fig. 16 and is completed when the vane wings A¹, A², A³ and A⁴ have reached the corresponding positions with the vanes 3 and 4 reversed relative to the Fig. 16 position.

To start the engine when neither the trunnion disc 5 nor the trunnion disc 5a is positively engaged with the associated shaft disc, the shaft is rotated in the direction of the drive as in the normal engine; it cannot be rotated backward owing to the trunnion pawls engaging the cylinder casing. As there is positive drive the most of the cycle, the only consideration for starting is the rotation of the abutment vanes from the abutment position whilst the driving vanes are out of positive engagement with the shaft. When this occurs, the engine will start with the rotation of the shaft as the spring and centrifugal pressure acting on the driving pawls will carry the piston vanes into positive engagement, the only resistances thereto being the inertia and friction of the light vanes.

For the engine to "freewheel" relative to the driving shaft to allow the rotating parts of the engine, other than the driving shaft and the shaft discs to slow down when the throttle is closed and the vehicle is coasting, both pairs of piston vanes are brought out of engagement with the driving shaft in the following manner:—

In the first place the petrol or heavy oil supply is cut off without closing the induction port to intake of air that there may be no explosive mixture in the cylinder. Thereupon one of the latches is brought into fixed engagement with its trunnion disc by partial rotation of the short arm 19 of the latch which turns on the pivot 19a (Figs. 14 and 15) disposed at a right angle to the pivot 8' so that it is brought into such position that it cannot be operated by the cam. The parts 8, 19 and 19a all swing or rotate as a unit about their axis 8' and the parts 8a, 19 and 19a also swing on or rotate as a unit about the other axis 8' but the arms 19 can be manually moved independently of such latches 8 and 8a in paths at a right angle to that of the latches, on said axes 8'. This results in the driving piston vanes compressing the air between them and the abutment vanes until they are carried out of positive engagement with the shaft and brought to rest by the cushioning action of the compressed air when the engine will "freewheel" as the shaft mechanism is fully disconnected from the two pairs of piston vanes except that the other latch will be raised and lowered with each revolution of the shaft.

Re-engagement of the mechanism of the piston vanes with the shaft mechanism is effected by rotating the short arm 19 of the latch back to its original position, for which purpose the lever arm 35 is employed, when the shaft cam will cause the latch to release the trunnion disc thus enabling the compressed air between the two pairs of piston vanes, or the spring and centrifugal pressure acting on the driving pawls of the shaft disc, to carry the abutment vanes into positive engagement with the shaft and the driving vanes into the abutment position. Arms 35 pass through slots 35' disposed circumferentially of casings 16 and 16a and are manually operable and may be fastened by any suitable means, if desired, in the different positions thereof.

As each pair of piston vanes acts alternately as abutment and driving vanes their average speed is one half of that of the driving shaft, that is each piston vane will make one revolution for two of the shaft.

When the wings of the vanes are small and of triangular form, a seal is preferably effected between the two pairs of piston vanes where they overlap their central bosses by inserting an angular piece 20 in a passage in each wing to press on suitable packing 21, a spring 22 being brought to bear on the angular piece 20.

I claim:—

1. In a rotary internal combustion engine adapted to perform two complete cycles of the required operations for internal combustion during each revolution of the shaft, a cylinder, a shaft journalled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, a casing for said non-reverse and driving gearing, a latch corresponding to each pair of piston vanes mounted on the said casing and adapted to engage the corresponding trunnion by means of the disk mounted thereon, said latch having an arm, a cam on the engine shaft adapted to engage the said arm so that the latch is operated to hold the piston vanes in position as abutment vanes through engagement with their trunnion disk until the piston vanes which are acting as driving vanes have reached the required position for the abutment vanes to be accelerated to the speed of the shaft for which purpose the latch is duly disengaged by the action of the cam, and a pivot member carried by said latch and adapted to carry the said arm so that both pairs of piston vanes can be put out of gear with the engine for free wheeling.

2. In a rotary internal combustion engine adapted to perform two complete cycles of the required operations for internal combustion during each revolution of the shaft, a cylinder, a shaft journalled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, a casing for said gearing, and said casing having cam surfaces for positively controlling the engagement and disengagement of said last mentioned pawls.

3. In a rotary internal combustion engine adapted to perform two complete cycles of the required operations for internal combustion during each revolution of the shaft, a cylinder, a shaft journalled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, and a locking arm on each of said last mentioned pawls, said locking arms being actuated alternately so as to prevent said last mentioned pawls moving independently.

4. In a rotary internal combustion engine adapted to perform two complete cycles of the required operations for internal combustion during each revolution of the shaft, a cylinder, a shaft journalled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, a casing for said gearing, a latch on said casing associated with each trunnion disk, cams on said shaft for controlling the engagement of said latches with said trunnion disks to hold the piston vanes in position as abutment vanes until the piston vanes which are acting as driving vanes have reached the required position for the abutment vanes to be accelerated to the speed of the shaft for which purpose the latch is disengaged by the action of the cam.

5. In a rotary internal combustion engine adapted to perform two complete cycles of the required operations for internal combustion during each revolution of the shaft, a cylinder, a shaft journaled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, a casing for said non-reverse and driving gearing, a latch on said casing associated with each trunnion disk, and cams upon said shaft for controlling the engagement of said latches with said trunnion disks to hold the piston vanes in position as abutment vanes until the piston vanes which are acting as driving vanes have reached the required position for the abutment vanes to be accelerated to the speed of the shaft for which purpose the latch is disengaged by the action of the cam and cam surfaces on said casing for positively controlling the engagement of the pawls upon the shaft disks.

6. In a rotary internal combustion engine adapted to perform two complete cycles of the required operations for internal combustion during each revolution of the shaft, a cylinder, a shaft journaled axially of said cylinder, two trunnions rotatable about the axis of said shaft, a pair of piston vanes on each trunnion, the vanes of the different trunnions coacting to receive the fuel charges between them for firing, non-reverse gearing for each trunnion to enable the vanes alternately to serve as abutments, said gearing comprising a disk on each trunnion, pawls on each disk, fixed ratchet teeth on said cylinder engageable by said pawls, driving gearing comprising disks keyed to said shaft and pawls upon said disks engaging teeth upon said trunnion disks, a casing, ratchet teeth on each trunnion disk, a pawl corresponding to each pair of piston vanes mounted on the said casing and adapted to engage said ratchet teeth, said pawl having an arm, and a cam on the engine shaft adapted to engage the said short arm so that the latch or pawl is operated to hold the piston vanes in position as abutment vanes through engagement with their trunnion disk until the piston vanes which are acting as driving vanes have reached the required positon for the abutment vanes to be accelerated to the speed of the shaft for which purpose the latch is disengaged by the action of the cam.

ALBERT WILLIAMS DAW.